United States Patent
Seido et al.

(10) Patent No.: US 8,039,171 B2
(45) Date of Patent: Oct. 18, 2011

(54) CURRENT-COLLECTING COMPOSITE PLATE FOR FUEL CELL AND FUEL CELL FABRICATED USING SAME

(75) Inventors: Masahiro Seido, Tsuchiura (JP);
Kazuhiko Nakagawa, Tsuchiura (JP);
Takaaki Sasaoka, Tsuchiura (JP);
Mineo Washima, Tsuchiura (JP)

(73) Assignee: Hitachi Cable, Ltd., Tokyo (JP)

( * ) Notice: Subject to any disclaimer, the term of this patent is extended or adjusted under 35 U.S.C. 154(b) by 606 days.

(21) Appl. No.: 12/244,057

(22) Filed: Oct. 2, 2008

(65) Prior Publication Data
US 2009/0092878 A1 Apr. 9, 2009

(30) Foreign Application Priority Data
Oct. 4, 2007 (JP) ................................ 2007-260812

(51) Int. Cl.
*H01M 4/64* (2006.01)
*H01M 4/66* (2006.01)
*H01M 8/00* (2006.01)

(52) U.S. Cl. ........ 429/520; 429/517; 429/518; 429/519; 429/522; 429/512; 429/483; 429/506; 429/492

(58) Field of Classification Search .................. None
See application file for complete search history.

(56) References Cited

U.S. PATENT DOCUMENTS

| | | | | |
|---|---|---|---|---|
| 4,217,401 | A * | 8/1980 | Pellegri et al. | 429/469 |
| 6,706,436 | B2 * | 3/2004 | Molter | 429/434 |
| 7,147,677 | B2 * | 12/2006 | Edlund | 29/623.4 |
| 7,323,266 | B2 * | 1/2008 | Morishima et al. | 429/465 |
| 2004/0247978 | A1 * | 12/2004 | Shimamune | 429/34 |
| 2006/0024555 | A1 * | 2/2006 | Kohno et al. | 429/35 |
| 2006/0269821 | A1 * | 11/2006 | Nakagawa et al. | 429/38 |

FOREIGN PATENT DOCUMENTS

| | | |
|---|---|---|
| JP | 2001-093538 | 4/2001 |
| JP | 2002-175817 | 6/2002 |
| JP | 2003-068325 | 3/2003 |
| JP | 2004-158437 | 6/2004 |
| JP | 2006-031963 | 2/2006 |

* cited by examiner

*Primary Examiner* — Krishnan S Menon
(74) *Attorney, Agent, or Firm* — Antonelli, Terry, Stout & Kraus, LLP.

(57) ABSTRACT

A current-collecting composite plate for a fuel cell configured with unit cells according to the present invention, which comprises: an insulator layer; and a plurality of pairs of conductor layers, the conductor layers being bonded to the insulator layer to be spaced apart from each other by a predetermined distance, each pair being used for adjacently disposed anode and cathode electrodes for a different one of the unit cells by sandwiching an electrolyte assembly therebetween. And, each conductor layer includes: a first conductor layer of a corrosion resistant metal treated with an electrically conductive surface treatment; a second conductor layer of a metal with low electrical resistivity; a through-hole penetrating the first conductor layer and the insulator layer; and a connecting portion formed of the second conductor layer for connecting the unit cells.

8 Claims, 7 Drawing Sheets

FIG. 8(b) ENLARGED

CURRENT-COLLECTING COMPOSITE PLATE FOR FUEL CELL AND FUEL CELL FABRICATED USING SAME

CLAIM OF PRIORITY

The present application claims priority from Japanese patent application serial no. 2007-260812 filed on Oct. 4, 2007, the content of which is hereby incorporated by reference into this application.

BACKGROUND OF THE INVENTION

1. Field of the Invention

The present invention relates to current-collecting thin composite plates for fabricating compact fuel cell stacks and to fuel cells fabricated using such a composite plate. In particular, the present invention relates to current-collecting composite plates for fuel cells with excellent corrosion resistance, excellent durability and low internal resistance and to fuel cells with a high power generation efficiency fabricated using such a composite plate.

2. Description of Related Art

Fuel cells have high conversion efficiency because they directly convert chemical energy into electrical energy. Also, they do not burn a fuel containing nitrogen (N), sulfur (S), etc. and therefore are environmentally friendly because they emit less air pollutants (such as $NO_x$ and $SO_x$) Examples of such fuel cells include polymer electrolyte fuel cells (PEFCs), phosphoric acid fuel cells (PAFCs), molten carbonate fuel cells (MCFCs) and solid oxide fuel cells (SOFCs). Among these, PEFCs are expected to be widely used in the future as power sources for automobiles, homes, mobile devices, uninterruptible power supply systems, etc.

Figure 1:
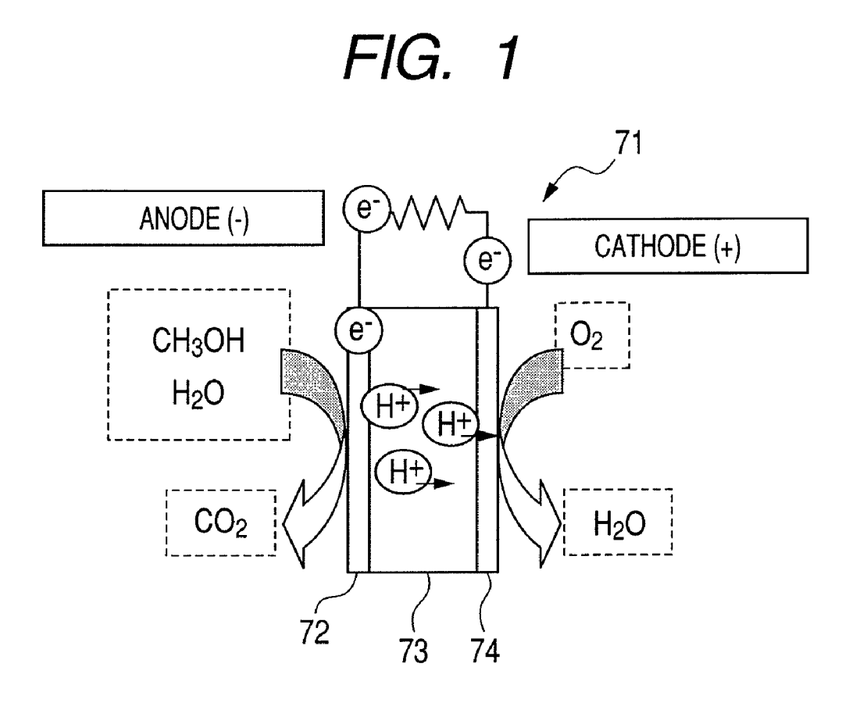
FIG. 1 is a schematic illustration showing a mechanism of power generation in a direct methanol fuel cell (DMFC).

FIG. 1 is a schematic illustration showing a mechanism of power generation in a fuel cell using methanol as a liquid fuel. This type of a fuel cell is called a direct methanol fuel cell (DMFC). As shown in FIG. 1, in a DMFC 71, a mixture of methanol fuel and water is supplied to a fuel electrode 72 where it produces hydrogen ions and carbon dioxide ($CO_2$) gas with the aid of a catalyst. The hydrogen ions migrate through a polymer electrolyte membrane 73 to a counter electrode as an oxidant electrode. Then, on an air electrode (oxidant electrode) 74, electrons generated by the ionization, oxygen as an oxidant and the hydrogen ions react to produce water. These sequential reactions allow generation of electric power, whereby electrical energy can be taken out from the fuel cell.

The liquid fuel and air (oxidant gas) are each supplied to the corresponding electrode via a passage comprising a channel which allows the respective substances to pass through. These passages also function to vent water and gases generated during power generation.

Figure 2:
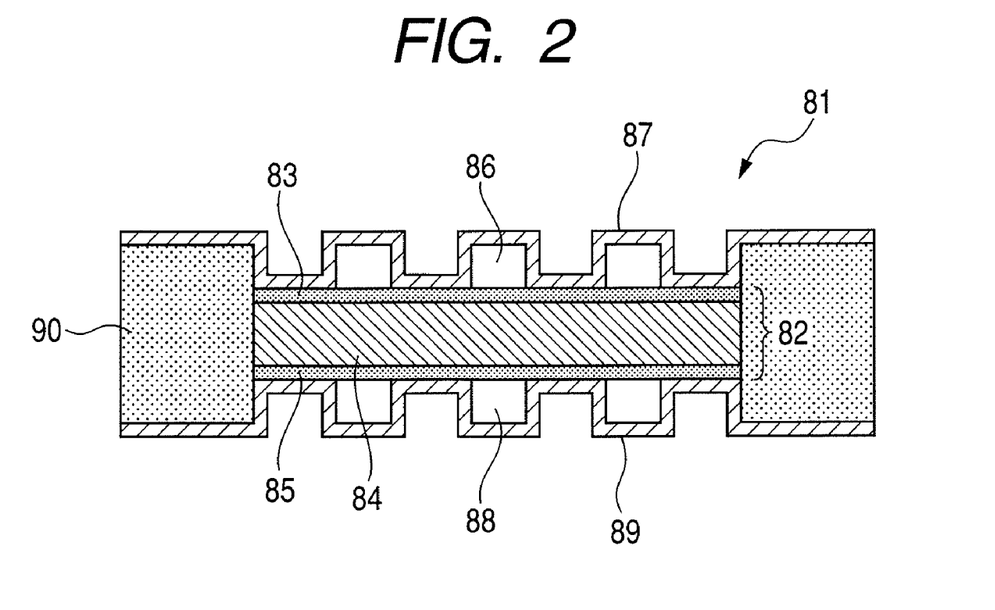
FIG. 2 is a schematic illustration showing a cross-sectional view of a conventional unit cell of a DMFC.

FIG. 2 is a schematic illustration showing a cross-sectional view of a conventional DMFC unit cell 81. It includes: an MEA 82 (comprising: a solid polymer electrolyte membrane 84; a fuel electrode 83 provided on one surface of the membrane 84; and an air electrode (oxidant electrode) 85 provided on the other surface of the membrane 84); a metal bipolar plate 87 facing the fuel electrode 83 of the MEA 82 and having multiple fuel passage conduits 86 on the side facing the MEA 82; a metal bipolar plate 89 facing the air electrode 85 of the MEA 82 and having multiple air (oxidant gas) passage conduits 88 on the side facing the MEA 82; and a gasket 90 provided between the bipolar plates 87 and 89 for sealing the perimeter of the MEA 82. Typically, a plurality of such fuel cells 81 are stacked in order to increase the power output. A bipolar plate is sometimes also called a "separator".

Figure 3:
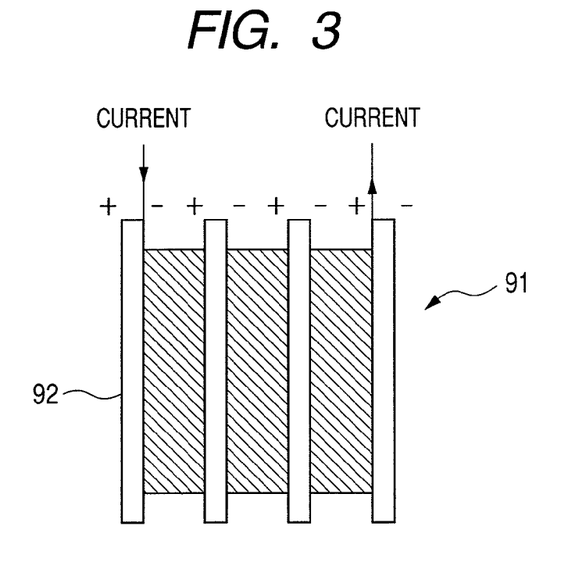
FIG. 3 is a schematic illustration showing a stack structure of a conventional fuel cell.

FIG. 3 is a schematic illustration showing a stack structure of a conventional fuel cell 91 using current-collecting plates (bipolar plates) 92. In the conventional fuel cell 91, the fuel electrode (i.e., anode, shown as "−" in FIG. 3) and the air electrode (i.e., cathode, shown as "+" in FIG. 3) are disposed alternately, i.e., in series.

DMFCs are expected to be used for compact sized mobile devices, which use a secondary battery at present, because it can take out electrical energy by using methanol as a liquid fuel, and it has been practically used in some areas. On the other hand, recently, PEFC using hydrogen gas as a fuel has been intensively investigated to be used for automobiles. In the PEFC, to supply hydrogen gas, a reformer is used to produce hydrogen containing gas from, e.g., methanol or natural gas.

In contrast, the DMFC has a possibility that its cell system can be considerably downsized because it is capable of taking out hydrogen ions directly from methanol. However, since the DMFC has a lower output density than the PEFC using hydrogen gas as a fuel, the application of DMFC is limited to devices with low electric power consumption at present. In the DMFC, other liquid fuels than methanol such as dimethylether can be used, and the practical use of each liquid fuel has been studied (see, e.g., JP-A-2002-175817).

The above JP-A-2002-175817 discloses a fuel cell of DMFC that a passage is formed to exhaust carbon dioxide ($CO_2$) gas produced during the power generation on its fuel electrode side so that an equipment for gas-liquid separation becomes unnecessary, whereby the DMFC system can be simplified and be downsized. However, turning again to FIG. 3, the fuel cell stack 91 as a conventional fuel cell has a disadvantage in that the fuel and oxidant need to be separately supplied to respective ones of adjacent unit cells (respective opposite surfaces of a bipolar plate) to prevent mixing of the two fluids, thereby potentially making the configuration of the fuel and oxidant supply and exhaust lines more complicated.

Figure 4:
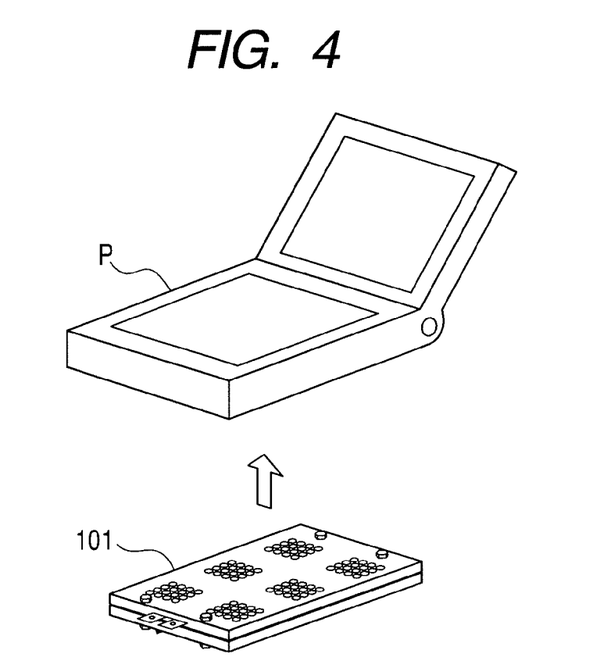
FIG. 4 is a schematic illustration showing a perspective view in which a conventional compact fuel cell is being assembled in a portable terminal.
Figure 5:
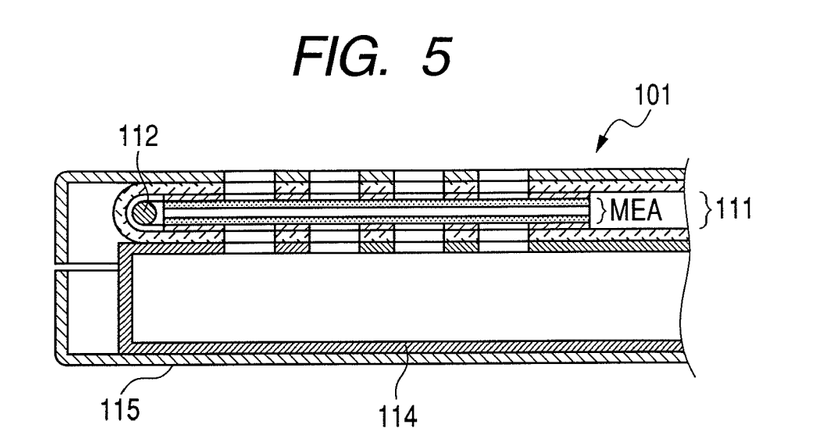
FIG. 5 is a schematic illustration showing a cross-sectional view of a structure of the conventional compact fuel cell shown in FIG. 4.
Figure 6:
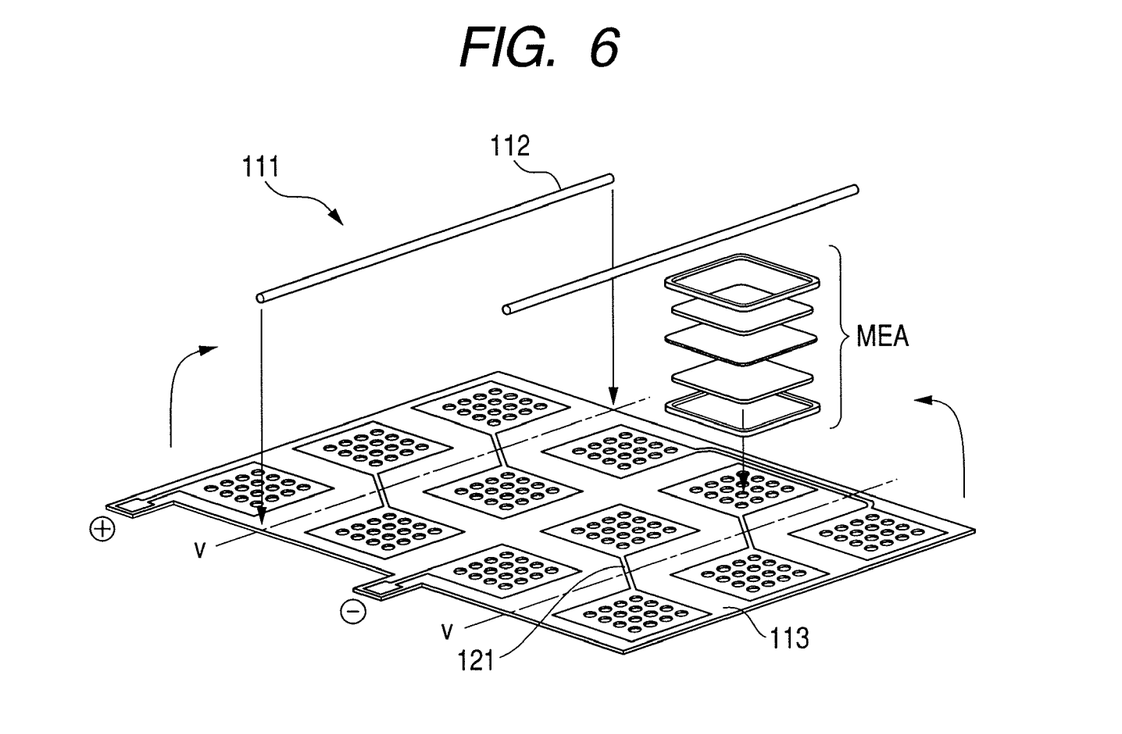
FIG. 6 is a schematic illustration showing an expanded perspective view of the conventional compact fuel cell shown in FIG. 4.

JP-A-2006-31963 discloses a membrane-electrode-assembly (MEA) module and a fuel cell aimed at downsizing a DMFC and simplifying a DMFC system. FIG. 4 is a schematic illustration showing a perspective view in which a conventional compact fuel cell is being assembled in a portable terminal; FIG. 5 is a schematic illustration showing a cross-sectional view of a structure of the conventional compact fuel cell shown in FIG. 4; and FIG. 6 is a schematic illustration showing an expanded perspective view of the conventional compact fuel cell shown in FIG. 4. As shown in FIGS. 5 and 6, in the MEA module 111, a current-collecting plate 113 with a film is folded around supporting rods 112 provided along valley lines v to tightly sandwich the MEAs between adjacent portions of the plate 113.

Such an MEA module is accommodated in a casing 115 having a fuel tank 114 to assemble a fuel cell 101 (shown in FIG. 5), which is then incorporated into a portable terminal P as shown in FIG. 4. The above JP-A-2006-31963 says that the MEA module may be applicable not only to DMFCs but also to PEFCs.

However, the technologies of the compact fuel cell described above do not offer a solution concerning corrosion resistance, durability; and internal resistance of the current-collecting plate. In the fuel cell stack 91 shown in FIG. 3, the current-collecting plate 92 is called the "bipolar plate", which functions to collect and carry current as well as functioning to separate the flowing of the fuel and oxidant gases along respective opposite surfaces thereof. Materials usable in such current-collecting plates 92 (bipolar plates) are being extensively studied for PEFC and DMFC applications.

For example, there is a proposed technique in which a base of dense carbon or stainless steel is plated with a 0.01 to 0.06 μm thick noble metal (e.g., JP-A-2001-93538). Also, another technique is described in which a cladding material of a corrosion resistant Ti-based metal is further covered with a contact layer having good electrical conductivity and good corrosion resistance (e.g., JP-A-2004-158437).

Generally, a fuel cell using a bipolar plate (current-collecting plate) formed of a SUS without surface treatment has a problem because constituent metals of the SUS can dissolve into the ambient environment and degrade the properties of the catalysts and electrode membrane of the fuel cell, thereby resulting in an extremely shortened service life. Also, when a SUS or a Ti-based cladding material is used for a fuel cell bipolar plate, the surface oxide film formed on such a metallic material can increase the electrical contact resistance and therefore increase the internal resistance of the fuel cell. As a result, some sort of electrically conductive surface treatment is needed.

In order to obtain a thin and compact fuel cell stack, the material used for the current-collecting plate is practically limited to metallic materials. Thus, the fuel cell stack 101 as shown in FIG. 4 also has similar problems of what core metal to employ and what optimum surface treatment to apply. On the other hand, the current-collecting plate 113 of the fuel cell stack 101 is configured so that the multiple unit cells are interconnected by surface wiring lines. Thus, the current-collecting plate 113 using a corrosion resistant metallic core (such as Ti and SUS) treated with an electrically conductive surface treatment still has a problem since the corrosion resistant metallic core has a relatively high electrical resistivity, and thereby the internal resistance of the plate 113 is prone to increase with increasing the current path length.

SUMMARY OF THE INVENTION

Therefore, there is need for further structural optimization in the compact fuel cell technologies. Under these circumstances, it is an objective of the present invention is to provide a current-collecting composite plate capable of providing a compact and high performance fuel cell and to provide a fuel cell fabricated using such a composite plate.

(1) According to one aspect of the present invention, there is provided a current-collecting composite plate for a fuel cell configured with unit cells, which comprises: an insulator layer; and a plurality of conductor layer pairs, the conductor layers being bonded to the insulator layer to be spaced apart from each other by a predetermined distance, each pair being used for adjacently disposed anode and cathode electrodes for a different one of the unit cells by sandwiching an electrolyte assembly therebetween, each conductor layer including: a first conductor layer of a corrosion resistant metal (such as Ti (titanium) and SUS (stainless steel)) treated with an electrically conductive surface treatment; a second conductor layer of a metal with low electrical resistivity (such as Cu (copper)) laminated on the first conductor layer; a through-hole penetrating the first conductor layer and the insulator layer; and a connecting portion formed of the second conductor layer for connecting the unit cells.

In the above aspect (1) of the present invention, the following modifications and changes can be made.

(i) The conductor layer used for the anode electrode of a first one of the unit cells is connected to the conductor layer used for the cathode electrode of an adjacent second one of the unit cells by the connecting portion.

(ii) The second conductor layer is formed in a mesh pattern.

(iii) The second conductor layer is made of Cu, Al (aluminum), Sn (tin) or an alloy of any one thereof.

(2) According to another aspect of the present invention, there is provided a fuel cell fabricated using the current-collecting composite plate according to the above aspect of the invention.

In the above aspect (2) of the present invention, the following modifications and changes can be made.

(iv) The composite plate is folded along a fold line portion located at the insulator layer extending between the pairs of conductor layers in such a manner that each electrolyte assembly fitted to one of a corresponding pair of conductor layers faces the other pair of conductor layers and that the unit cells are configured.

(v) A sealant for sealing the electrolyte assemblies is provided along the fold line portion and along the outer periphery of the composite plate.

(vi) The fuel cell is a direct methanol fuel cell or a polymer electrolyte fuel cell.

Advantages of the Invention

The present invention can provide a thin current-collecting composite plate for fuel cells having low in-plane electrical resistance. It can also provide a compact (space-saving) and high-performance fuel cell fabricated using such a composite plate.

BRIEF DESCRIPTION OF THE DRAWINGS

FIG. 8(*a*) is a schematic illustration showing a cross-sectional view of a folded current-collecting composite plate in FIG. 7 incorporating therein an MEA; and FIG. 8(*b*) is a partially enlarged view of FIG. 8(*a*).

DETAILED DESCRIPTION OF THE PREFERRED EMBODIMENTS

Firstly, electrical resistivity of a material conventionally used for a bipolar plate of fuel cell is reviewed. Table 1 shows the electrical resistivity of such materials in comparison with that of Cu. As shown in Table 1, materials conventionally used for the bipolar plates, such as SUS, Ti and C (graphite), have good corrosion resistance but usually have high electrical resistivity, thus resulting in an increase in the internal resistance of such a current-collecting plate for fuel cells.

TABLE 1

| Material | Electrical Resistivity ($\mu\Omega \cdot cm$) | Resistivity Ratio (Material/Cu) |
| --- | --- | --- |
| SUS316 | 74 | 44 |
| Ti | 55 | 32 |
| Cu | 1.7 | 1 |
| Al | 2.7 | 1.6 |
| Dense graphite | 1000 | 588 |

Specifically, the electrical resistivity of SUS and Ti is much higher than that of Cu by a factor of 30 to 40. Thus, if a good conductor such as Cu is used in a current-collecting plate of compact fuel cell, the in-plane internal electrical resistance of the plate can be significantly reduced. However, when a material such as Cu contacts the fuel cell fluids (such as product water and an aqueous fuel solution), it can dissolve into the fluids and degrade the properties of the solid polymer electrolyte membrane.

In order to address the problems with compact fuel cells described above, the present inventors are proposing a current-collecting composite plate for fuel cells in which a corrosion resistant metal such as Ti and SUS is used for the electrode layer of the plate contacting the electrolyte (electricity generating) assembly, while for the conducting layer opposite to the electrode layer a metal with low electrical resistivity such as Cu covered with an insulator layer is used in such a manner as to prevent it from contacting the reactant and product fluids. After an intensive investigation, the inventors have devised the present invention.

Preferred embodiments of the present invention will be described below with reference to the accompanying drawings. However, the present invention is not limited to the embodiments described herein.

First Embodiment of the Invention

Figure 7:
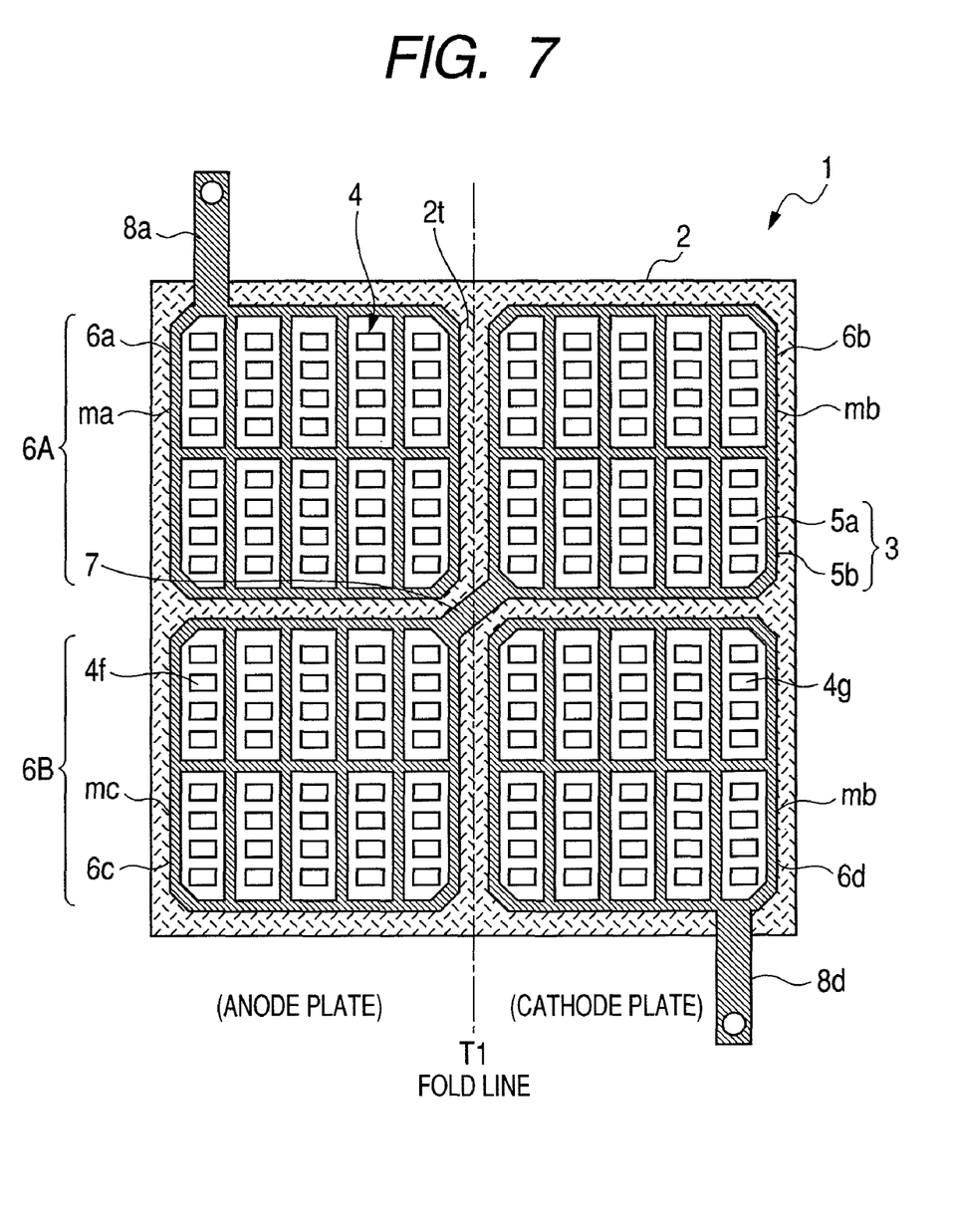
FIG. 7 is a schematic illustration showing an extended plan view of a current-collecting composite plate for fuel cells according to a first preferred embodiment of the present invention.

FIG. 7 is a schematic illustration showing an extended plan view of a current-collecting composite plate for fuel cells according to a first preferred embodiment of the present invention. FIG. 7 shows a current-collecting composite plate 1 for fuel cells having two unit cells. Hereinafter, a "current-collecting composite plate for fuel cells" is referred to simply as a "current-collecting composite plate". The current-collecting composite plate 1 is configured by bonding an insulator layer 2 (of two sub-layers) and a conductor layer 3 (of multiple conductors) and forming through-holes 4 penetrating the bonded layers. A part of the conductor layer 3 of one cell is connected to a part of the conductor layer 3 of another cell by a connecting portion 7. Also, the composite plate 1 is configured to be folded along a fold line T1 so that the resulting opposing conductor layers 3 of each cell sandwich a later-described electrolyte (electricity generating) assembly 22 (see FIGS. 8(a), 8(b) and 9).

For the insulator layers 2, two insulating polyimide sheets are used with each having an adhesive layer on one surface (FIG. 7 does not show the insulating polyimide sheet on the front side of the drawing plane). This embodiment is configured so that the conductor layer 3 is sandwiched between the two insulating polyimide sheets.

One surface of the conductor layer 3 (the electrode surface on the back side of FIG. 7) contacts the electrolyte (electricity generating) assembly 22 such as an MEA (which will be described later with reference to FIGS. 8(a), 8(b) and 9). The other surface of the conductor layer 3 (the conducting surface on the front side of FIG. 7) is bonded to the insulator layer 2.

The conductor layer 3 is a stack of: a first conductor 5a of a corrosion resistant metal (such as Ti and SUS) treated with an electrically conductive surface treatment; and a second conductor 5b of a metal with low resistivity such as Cu. In this embodiment, as the electrically conductive surface treatment, a nanofilm of a noble metal such as Au (gold), Ag (silver), or Pt (platinum) is formed on the surface of the corrosion resistant metal. For the second conductor 5b, a metal having an electrical resistivity less than that of the corrosion resistant metal used for the first conductor 5a is used. For example, Cu, Al, Sn, and an alloy of any one thereof are preferable.

Four rectangular first conductors 5a, each for a different one of the cell electrodes, are bonded on the insulator layer 2 in such a manner as to be spaced apart from each other by a predetermined distance. In this embodiment, the outer periphery of the composite plate 1 and the spacing between the four cell electrode plates 6a-6d are only formed for the insulator layer 2 in the thickness direction.

In FIG. 7, the two cell electrode plates 6a and 6c on the left side of the folding line T1 are the anode electrode plates and the two cell electrode plates 6b and 6d on the right side are the cathode electrode plates. The laterally adjacent cell electrode plates 6a and 6b constitute the first cell electrode pair 6A, and the laterally adjacent two cell electrode plates 6c and 6d which are below and adjacent to the pair 6A constitute the second (adjacent) cell electrode pair 6B.

Each second conductor 5b is formed in a mesh pattern sheet and four mesh sheets ma-md are laid over the four cell electrode plates 6a-6d, respectively. In each of the mesh sheets ma-md, a plurality of (10 in FIG. 7) openings are arranged in a row and column array, each opening covering a certain number of (four in FIG. 7) through-holes 4. The mesh sheets ma-md can be formed, for example, by punching such openings in a plate of the second conductor 5b with a press machine or the like.

In the composite plate 1, the cell electrode plates of two different unit cells are connected to each other by the connecting portion made of the second conductor 5b. Specifically, in the first embodiment, the cell electrode plate 6b (cathode electrode plate) of the cell electrode pair 6A is connected, by a diagonally extending connecting portion 7, to the cell electrode plate 6c (anode electrode plate) of the cell electrode pair 6B. More specifically, the corners of the mesh sheets mb and mc that are diagonally opposite each other are connected by the above-mentioned connecting portion 7.

From a left portion of the topside of the mesh sheet ma, an anode electrode terminal 8a is extended out across the outer periphery of the composite plate 1. Similarly, from a right portion of the bottom side of the mesh sheet md, a cathode electrode terminal 8d is extended out in the direction opposite to the extension of the terminal 8a. The electrode terminals 8a and 8d and connecting portion 7 are preferably formed integrally with the mesh sheets ma-md when the openings of the mesh sheets are punched.

One sub-layer of the insulator layers 2 facing the electrolyte assemblies (on the back side of the drawing plane) is provided with the openings not shown, each surrounding a different one of the cell electrode plates 6a-6d, so that the cell electrode plates 6a-6d can directly contact one of the corresponding electrolyte assemblies to enable electrical conduction. The other sub-layer of insulator layers 2, which is bonded to the conducting surface of the conductor layer 3 (on the front side of the drawing plane) is provided with openings, each surrounding a different one of the through-holes 4, so as to prevent the cell electrode plates 6a-6d and mesh sheets ma-md from being exposed.

In this embodiment, a plurality of rectangular through-holes 4 that penetrate the insulator layer 2 and first conductor 5a are arranged in an array. For example, in FIG. 7, each cell electrode plate has 40 through-holes 4, so that 160 holes 4 are provided in total. The through-holes 4 on the right side of the figure (the anode plate side) serve as passage holes 4f for fuel (such as methanol), and those on the left side of the figure (the cathode plate side) serve as passage holes 4g for oxidant gas (such as air and oxygen).

The through-holes 4 may be formed after the conductor layer 3 has been bonded to the insulator layer 2. Or, alternatively, they may be preformed in the insulator and conductor layers 2 and 3 independently of each other and thereafter the conductor layer 3 may be bonded to the insulator layer 2 in such a manner that all the holes 4 of the layer 3 are aligned with the corresponding holes 4 of the layer 2.

An electrolyte assembly 22 is provided on the surface (on the back side of the figure) of each of the cell electrode plates 6a and 6c (or 6b and 6d). The composite plate 1 has a fold portion 2t, which is made of only the insulator layer 2 in the thickness direction, between the cell electrode plates 6a and 6c and between cell electrode plates 6b and 6d. The composite plate 1 is folded backward (as looking into FIG. 7) along the fold line T1 (ridge line) extending vertically in the figure, and the cell electrode plates 6b and 6d (or 6a and 6c) are laid over the corresponding electrolyte assemblies 22, thereby being able to form two unit cells.

Figure 8A:
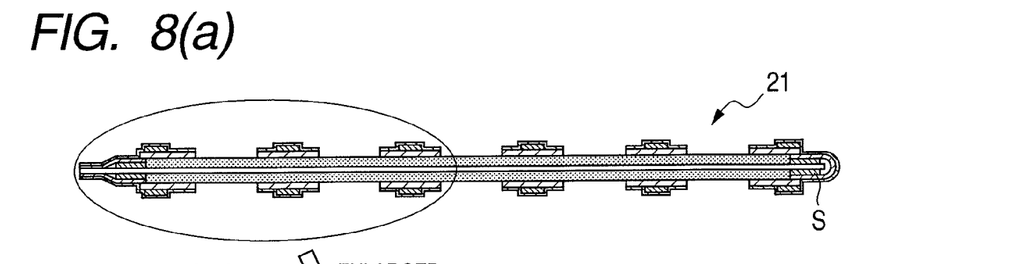
Figure 8B:
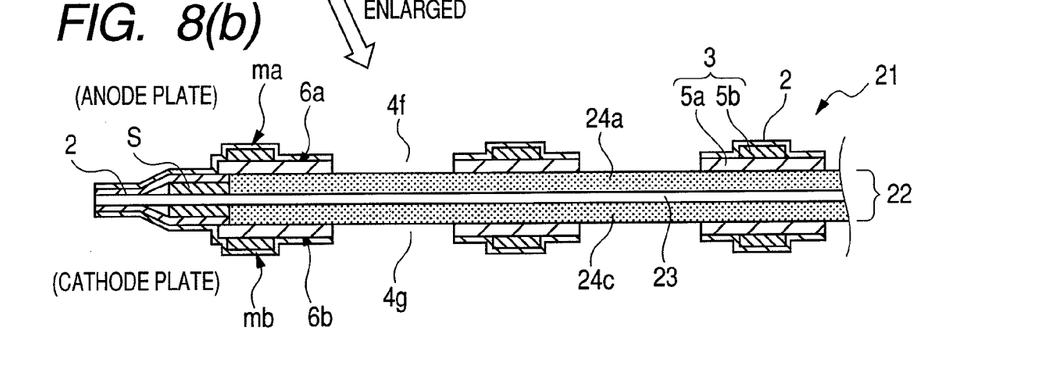

That is, the two electrolyte assemblies 22 are fitted on the composite plate, which are then folded together along the fold line T1, thereby obtaining an MEA module 21 shown in FIGS. 8(*a*) and 8(*b*). FIG. 8(*a*) is a schematic illustration showing a cross-sectional view of a folded current-collecting composite plate in FIG. 7 incorporating therein an MEA; and FIG. 8(*b*) is a partially enlarged view of FIG. 8(*a*). In order to seal the electrolyte assemblies 22, a sealant S is disposed on the inner surface (on the back side of FIG. 7) of the fold portion 2t and on the inner surface of the outer periphery of the composite plate 1 (i.e., so as to surround the each cell electrode plates 6a-6d).

As shown in FIGS. 8(*a*) and 8(*b*), to assemble the first cell, there are laid, one on top of another and in close contact with each other: the first insulator layer 2 (insulating polyimide sheet); the mesh sheet ma; the cell electrode plate 6a; the electrolyte assembly 22; the cell electrode plate 6b; the mesh sheet mb; and the second insulator layer 2 (insulating polyimide sheet). Then, these members are integrated together while sealing the portions surrounding the electrolyte assemblies 22 with the sealants S. The second cell is similarly assembled.

The electrolyte assembly (MEA) 22 includes: a solid polymer electrolyte membrane 23; an anode side diffusion layer 24a provided on one surface of the membrane 23 to serve as the fuel electrode; and a cathode side diffusion layer 24c provided on the other surface of the membrane 23 to serve as the oxidant electrode.

A tank for containing a liquid fuel (such as an aqueous methanol solution) is connected to the anode side of the MEA module 21. These are accommodated in a casing in a configuration (such as shown in FIG. 5) in which part of the cathode side of the module 21 is exposed to air, thereby providing a DMFC. The two coplanar electrolyte assemblies 22 of the MEA module 21 are connected in series; thus, generating, across the electrode terminals 8a and 8d, a voltage equal to the sum of voltages across all the MEA connected series in the module 21 (two MEAs in the first embodiment).

Next, a method for fabricating a fuel cell stack by stacking the fuel cells which are prepared by using the composite plates 1 according to this embodiment will be described by referring to FIG. 9. FIG. 9 is a schematic illustration showing a structure of a fuel cell stack using the current-collecting composite plates in FIG. 7.

Figure 9:
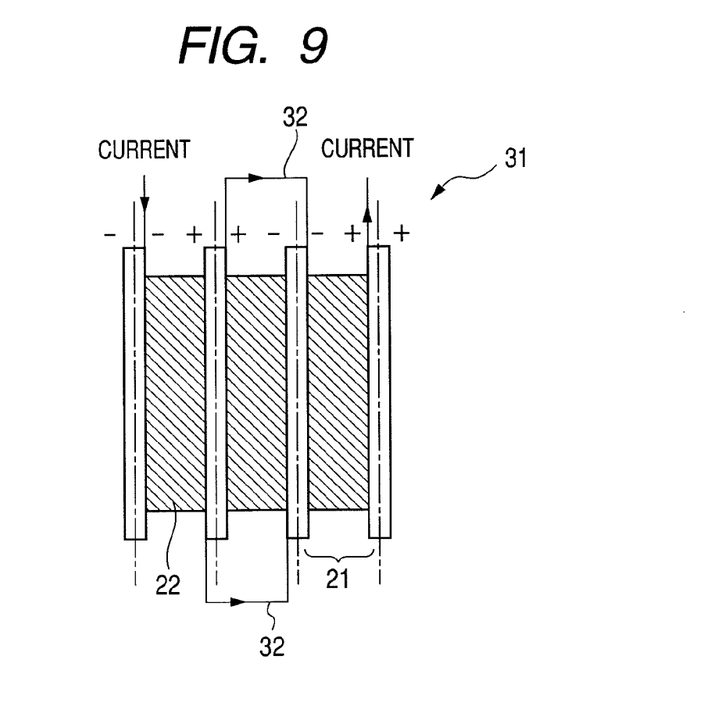
FIG. 9 is a schematic illustration showing a structure of a fuel cell stack using the current-collecting composite plates in FIG. 7.

As shown in FIG. 9, a fuel cell stack 31 is configured in such a manner that the anode electrode plates (or cathode electrode plates) of adjacent composite plates 1 face each other. FIG. 9 shows an example in which the anode and cathode electrode plates are stacked in the order of "anode", "cathode", "cathode", "anode", "anode", "cathode" and "cathode", where the anode and cathode electrode plates are represented by marks "−" and "+" respectively.

Although not shown in FIG. 9, each pair of adjacently disposed anode (and cathode) electrode plates are electrically insulated from each other by, e.g., a separator having fuel (or oxidant) gas conduits and disposed in the position indicated by dashed-dotted lines. Therefore, in the fuel cell stack 31, a power collecting wiring 32 is required, shown by an arrowed line in FIG. 9.

Effects and advantages of the first embodiment will now be described.

In the current-collecting composite plate 1 of this embodiment, the conductor layer 3 is formed by laminating: the first conductor 5a of a corrosion resistant metal treated with an electrically conductive surface treatment; and the second conductor 5b of a metal with an electrical resistivity lower than that of the first conductor 5a. In addition, the cell electrode plates 6a-6d (serving as a different electrode of each cell) made of the first conductor 5a are disposed to be spaced apart from each other, but the cell electrode plates 6b and 6c are connected by the connecting portion 7. Thus, in the MEA module 21 fabricated using the composite plate 1, the two electrolyte assemblies 22 are disposed to be coplanar with each other and are connected in series by the connecting portion 7 made of the second conductor 5b.

Also, the four cell electrode plates are backed by the respective mesh sheets ma-md made of the second conductor 5b. Thus, with the composite plate 1, current generated by each unit cell can be efficiently conducted through the low resistance mesh sheets ma-md. Hence, the MEA module 21 using the composite plate 1 and formed by connecting multiple unit cells in a series has low internal resistance and therefore can generate a high electromotive force. For the same reason, the fuel cell stack 31 configured by stacking multiple MEA module 21 can provide a high electromotive force.

Generally, when a fuel cell has therewithin an electrical resistance component, a voltage loss occurs due to the electrical resistance, thereby incurring degradation in the power generation efficiency of the fuel cell. Conventional current-collecting composite plates (formed of a corrosion resistant metal treated with a surface treatment) are prone to suffer from a voltage loss due to the high internal resistance thereof. Such a voltage loss can result particularly when current flows in-plane (e.g., see FIG. 6). By contrast, the composite plate 1 according to the present invention can solve such a problem by using the mesh sheets ma-mb and connecting portion 7 (both made of the low resistivity second conductor 5b). Hence, by using the composite plate 1 having a low internal resistance, a thin and compact fuel cell with improved performance can be obtained, thus contributing to the commercialization of fuel cells.

Also, the first conductor 5a of the composite plate 1 is made of a corrosion resistant metal treated with an electrically conductive surface treatment; and the connecting portion 7 and mesh sheets ma-md are made of the low resistive second conductor 5b and are covered with the insulator layer 2. Therefore, the problem of performance degradation of a fuel cell due to dissolution of metallic ions can be prevented, and also contact and wiring resistances in the fuel cell can be reduced. Prevention of the dissolution of metallic ions can increase the durable periods of the composite plate 1 and electrolyte assemblies 22, thus leading to the extended service life of a fuel cell.

The components (such as the mesh sheets ma-md) of the composite plate 1 can be readily formed by pressing or the like, thus facilitating the mass production thereof. Hence, the costs of the composite plate 1 and fuel cell stack 31 can be reduced without sacrificing performance.

In addition, to assemble the MEA module 21, the electrolyte assemblies 22 are fitted on the cell electrode plates, which are then folded together along the insulator-layer fold portion 2t that is more flexible than the cell electrode plates 6a-6d. Thus, the MEA module 21 composed of two unit cells (and therefore the fuel cell stack 31) can be fabricated simply and compactly.

Furthermore, the fuel cell stack 31 fabricated using the composite plates 1 is configured in such a manner that the anode electrode plates (or cathode electrode plates) of adjacent composite plates 1 face each other. Hence, unlike a conventional fuel cell stack 91 shown in FIG. 3, the fuel supply line (or the oxidant gas supply line) can be shared. This too simplifies the structure of the fuel cell stack 31 and enables low cost.

This embodiment has been described for a case in which the single metal composite 1 is folded to sandwich two MEAs 22. Instead, for example, two separate metal composites may be formed by dividing the metal composite 1 of FIG. 7 and be independently folding it to sandwich the respective MEAs 22 and then be connected to each other by a connecting member. In addition, this embodiment has been described for a DMFC, but can be similarly applied to PEFCS.

Second Embodiment of the Invention

Next, a second embodiment will be described. While the first embodiment describes the composite plate 1 of a two-unit-cell structure, a composite plate having more than two unit cells is also readily formed to increase the output voltage.

Figure 10:
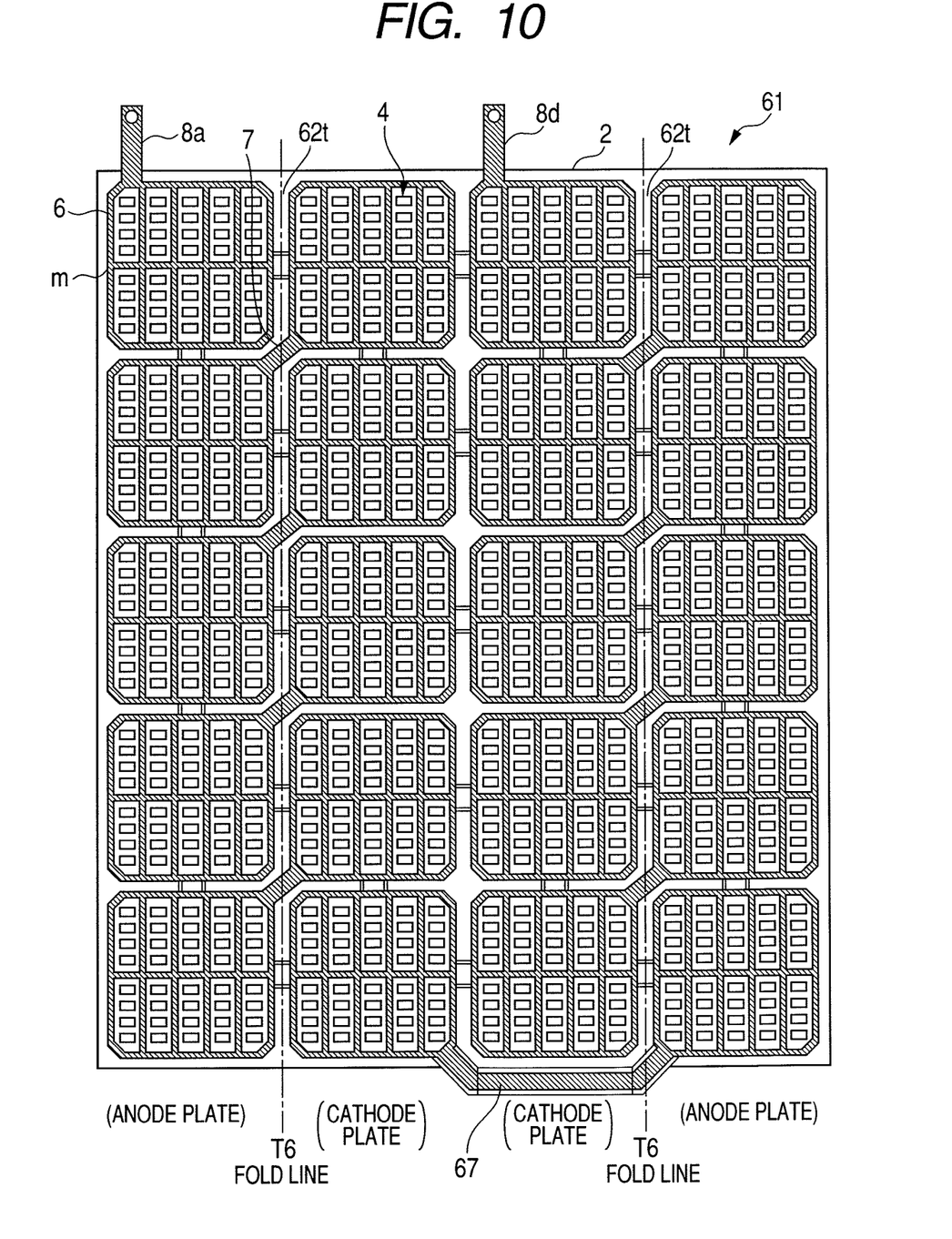
FIG. 10 is a schematic illustration showing an extended plan view of a current-collecting composite plate for fuel cells according to a second embodiment of the present invention.

FIG. 10 is a schematic illustration showing an extended plan view of a current-collecting composite plate for fuel cells according to a second embodiment of the present invention. As shown in FIG. 10, cell electrode plates 6 of a composite plate 61 according to the second embodiment are arranged (looking into FIG. 10) in a 4-column×5-row array, in which the anode cell electrode plates 6 are in the first and fourth columns and the cathode cell electrode plates 6 in the second and third columns.

The current-collecting composite plate 61 has a 10-cell structure. It includes 20 cell electrode plates 6 of the first conductor 5a and 20 mesh-sheets m of the second conductor 5b. The cathode electrode plate 6 of eight of the ten unit cells is connected to the anode electrode plate 6 of the next unit cell by a diagonally extending connecting portion 7 (therefore, eight such connecting portions 7 are provided in total).

In the composite plate 61, from a left portion of the top side of the cell electrode plate 6 positioned in the first column and first row, an anode electrode terminal 8a is extended out similarly to the first embodiment; also, from a left portion of the top side of the cell electrode plate 6 positioned in the third column and first row, a cathode electrode terminal 8d is extended out in parallel to the terminal 8a. Further, the bottom-right corner of the mesh sheet m positioned in the second column and fifth row is connected to the bottom-left corner of the mesh sheet m positioned in the fourth column and fifth row by a connecting portion 67 formed in a substantially U-shape.

Also, the composite plate 61 has two insulator-layer fold portions 62t respectively provided: between the first and second columns and between the third and fourth column. When an MEA module is assembled, the composite plate 61 is folded backward (as looking into in the figure) along two vertical fold lines T6 respectively extending along these two fold portions 62t. The other configurations of the MEA module are similar to those of the MEA module 21 of the first embodiment.

The composite plate 61 also provides the same effects and advantages as the composite plate 1 for the same reasons as those given above. In addition, even when the number of unit cells incorporated in the composite plate of the invention is increased, for example, from 2 (as in the composite plate 1) to 10 (as in the composite plate 61), it does not appreciably add to the fabrication process. Hence, a compact and high performance fuel cell can be readily fabricated.

EXAMPLES

Example 1

For the cell electrode plates 6a-6d (the first conductor 5a), a 0.1-mm-thick Ti film coated with a noble metal nanofilm (hereinafter "M coat") was used. For the mesh sheets ma-md (the second conductor 5b), a 80-μm-thick Cu film was used. The composite plate shown in FIG. 7 was formed using these materials (Ti with an M coat and Cu) and a fuel cell stack 31 of the FIG. 9 configuration was assembled using this composite plate 1.

Comparative Example 1

In order to evaluate the effectiveness of the second conductor, as a Comparative example 1, a composite plate without the mesh sheets was prepared and therefore composed of only the cell electrode plates and connecting portion (both formed of a 0.1-mm-thick Ti film coated with a noble metal nanofilm). A fuel cell stack 31 of FIG. 9 was assembled using this Comparative example 1 composite plate.

Figure 11:
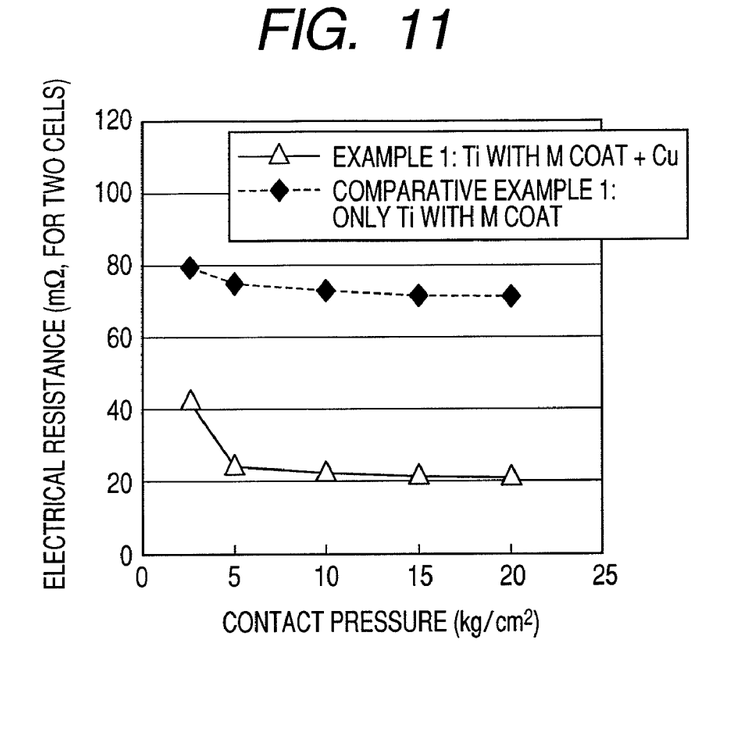
FIG. 11 is a graph showing a relationship between electrical resistance along the current path of the current-collecting composite plate and contact pressure to the composite plate of Example 1 and Comparative example 1.

FIG. 11 is a graph showing a relationship between electrical resistance along the current path of the current-collecting composite plate and contact pressure to the composite plate of Example 1 and Comparative example 1. Here, the electrical resistance across the two terminals described above was measured by the four-probe resistive method for samples in which only diffusion layers (24a and 24c in FIG. 8(b)) were inserted instead of the MEAs. Although the resistances for Example 1 and Comparative example 1 vary with contact pressure, as shown in FIG. 11, they are both substantially constant in the typically employed contact pressure range from 10 to 20 kg/cm². As shown, the resistance for Example 1 is lower than that for Comparative example 1 by a factor of about 3.5. If the resistance of the diffusion layer is subtracted from each measured resistance for more accurate evaluation, the effect of Example 1 should be greater than that shown by the above comparison.

Figure 12:
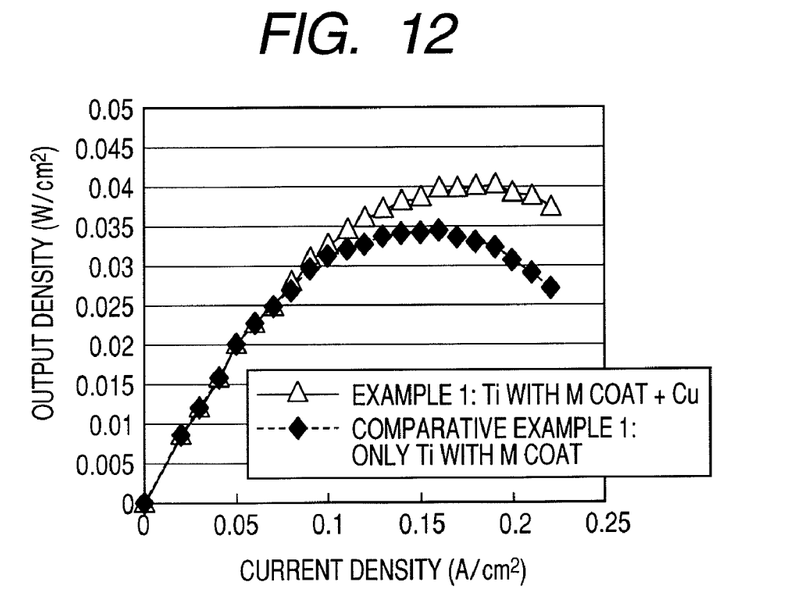
FIG. 12 is a graph showing a relationship between output density and current density of a fuel cell using the current-collecting composite plate of Example 1 and Comparative example 1.

FIG. 12 is a graph showing a relationship between output density and current density of a fuel cell using the current-collecting composite plate of Example 1 and Comparative example 1. FIG. 12 shows the electricity generation characteristics of the fuel cell 31 of Example 1 and the fuel cell of Comparative Example 1. The measurements were performed at room temperature using an MEA available from Japan Gore-Tex Inc. and a 20% methanol solution. As shown, the output density of the Comparative example 1 fuel cell reached a maximum value of approximately 0.035 W/cm² at a current density of approximately 0.15 A/cm² and then decreases.

In contrast, for the fuel cell 31 of Example 1, the output density reached a maximum value of approximately 0.04 W/cm² at a current density of approximately 0.2 A/cm², remained constant in a certain range and then slightly decreased. The output densities of the fuel cell 31 of Example 1 were approximately 15% greater than those of the fuel cell of Comparative Example 1. This result was consistent with what was expected from the above results of the resistance difference between the composite plates of the two examples (Example 1 and Comparative example 1).

Comparative Example 2

In order to estimate the durability of the composite plate and fuel cell of Example 1, as Comparative example 2, there was prepared a current-collecting composite plate formed of only a Cu layer with no surface treatment and a fuel cell fabricated using the composite plate. For the two examples (Example 1 and Comparative example 2), the change in the output density characteristics with age was measured at room temperature using a 20% methanol solution. The fuel cell of Comparative Example 2 showed deterioration in a few hours. In contrast, in the fuel cell 31 of Example 1, there was no deterioration even after several hundreds of hours.

Example 2

A composite plate 61 shown in FIG. 10 and a fuel cell fabricated using this composite plate 61 were prepared using the same conditions as those employed in Example 1. A DMFC having an output density of approximately 45 mW/cm² and a total power of 22.5 W was obtained. This demonstrates that by using the composite plate 61, a compact and high-power fuel cell can be fabricated.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A current-collecting composite plate for a fuel cell configured with unit cells, comprising:
    an insulator layer; and
    a plurality of pairs of conductor layers, the conductor layers being bonded to the insulator layer to be spaced apart from each other by a predetermined distance, each pair being used for adjacently disposed anode and cathode electrodes of a different one of the unit cells by sandwiching an electrolyte assembly therebetween, each conductor layer including:
    a first conductor layer of a corrosion resistant metal treated with an electrically conductive surface treatment;
    a second conductor layer of a metal with low electrical resistivity laminated on the first conductor layer;
    a through-hole penetrating the first conductor layer and the insulator layer; and
    a connecting portion formed of the second conductor layer for connecting the unit cells.

2. The current-collecting composite plate according to claim 1, wherein:
    the conductor layer used for the anode electrode of a first one of the unit cells is connected to the conductor layer used for the cathode electrode of an adjacent second one of the unit cells by the connecting portion.

3. The current-collecting composite plate according to claim 1, wherein:
    the second conductor layer is formed in a mesh pattern.

4. The current-collecting composite plate according to claim 1, wherein:
    the second conductor layer is made of Cu, Al, Sn, or an alloy of any one thereof.

5. A fuel cell fabricated using the current-collecting composite plate according to claim 1.

6. The fuel cell according to claim 5, wherein:
    the composite plate is folded along a fold line portion located at the insulator layer extending between the pairs of conductor layers in such a manner that each electrolyte assembly fitted to one of a corresponding pair of conductor layers faces the other pair of conductor layers and that the unit cells are configured.

7. The fuel cell according to claim 5, wherein:
    a sealant for sealing the electrolyte assemblies is provided along the fold line portion and along the outer periphery of the composite plate.

8. The fuel cell according to claim 5, wherein:
    the fuel cell is a direct methanol fuel cell or a polymer electrolyte fuel cell.

* * * * *